United States Patent [19]

Wainwright et al.

[11] Patent Number: 4,541,695
[45] Date of Patent: Sep. 17, 1985

[54] ZOOM LENS FOR CAMERAS

[75] Inventors: Ronald C. Wainwright, Stevenage; Nicholas M. Goy, Granchester; John D. Anderson, Trumpington; Robert M. Pettigrew, Foxton; John D. Bradbrook, Rouston, all of England

[73] Assignee: Establissements Pierre Angenieux SA, France

[21] Appl. No.: 491,351

[22] Filed: May 4, 1983

[30] Foreign Application Priority Data

May 8, 1982 [GB] United Kingdom ................ 8213361

[51] Int. Cl.³ .............................................. G02B 15/18
[52] U.S. Cl. ...................................... 350/429; 364/525
[58] Field of Search ................ 350/429, 430; 364/525

[56] References Cited

U.S. PATENT DOCUMENTS

4,043,642 8/1977 Hirose et al. ........................ 350/429
4,054,372 10/1977 Schroeder ........................... 350/429

Primary Examiner—John K. Corbin
Assistant Examiner—Paul Dzierzynski
Attorney, Agent, or Firm—Nelson E. Kimmelman

[57] ABSTRACT

A camera zoom lens system comprising; means for generating and storing a first information signal representing a predetermined position of the first movable lens group, means for generating a second information signal whose value determines a relationship between the respective positions of said first and second movable lens groups, first computing means for deriving from the stored first information signal a third signal representing the position to which the second movable lens group must move so that both lens groups produce an in-focus image of the object at infinity, second computing means responsive to the first and second information signals for generating a correction signal which when combined with the third signal produces an output signal representing the position to which the second movable lens group must move so that both lens groups will produce an in-focus image of an object at a specified distance, third computing means responsive to the correction signal and the third signal for generating and storing a fourth signal for the second movable lens group; sensing means for producing additional information signals relating to the actual positions of said lens groups, a central processor unit responsive to the first, fourth and additional signals for producing two error signals corresponding to any discrepancy between the actual positions of said lens groups and the positions represented by said first and fourth signals respectively, and means responsive to said error signals for moving the lens groups respectively to positions corresponding to said first and fourth signals.

14 Claims, 10 Drawing Figures

$$dY = 0.5\left[\frac{2057.5977}{113.40187-X} - \frac{2057.5977}{(113.40187-X)+\left(\frac{21137.074}{Z-36.374612}\right)}\right.$$

$$-\sqrt{\left\{(274.9601-X)+\left(\frac{2057.5977}{113.40187-X}\right)\right\}^2 - 25434.719}$$

$$\left.+\sqrt{\left\{(274.9601-X)+\frac{2057.5977}{(113.40187-X)+\left(\frac{21137.074}{Z-36.374612}\right)}\right\}^2 - 25434.719}\right]$$

Example: fw  Z = 1000 mm.
X = 49.0425 mm.
dY = -1.1604 mm.

FIG. 7

| X | Y | A | B | C |
|---|---|---|---|---|
| .0000 | .0000 | -.0001362809 | -.0807554672 | .0000000000 |
| 7.5450 | -.6170 | -.0002093505 | -.0829920477 | .0000000000 |
| 15.0900 | -1.2494 | -.0000425984 | -.0847548045 | .0000000000 |
| 22.6350 | -1.8913 | .0000636780 | -.0855831677 | .0000000000 |
| 30.1800 | -2.5334 | .0002369975 | -.0843972830 | .0000000000 |
| 37.7250 | -3.1608 | .0004936144 | -.0818555335 | .0000000000 |
| 45.2700 | -3.7503 | .0009055453 | -.0750894632 | .0000000000 |
| 52.8150 | -4.2653 | .0015568177 | -.0625480451 | .0000000000 |
| 60.3600 | -4.6486 | .0024557756 | -.0398011928 | .0000000000 |
| 67.9050 | -4.8091 | .0037175684 | -.0018575289 | .0000000000 |
| 71.6775 | -4.7632 | .0053682289 | .0223714198 | .0000000000 |
| 75.2226 | -4.6486 | .0074897149 | .0542229828 | .0000000000 |
| 79.2226 | -4.4288 | .0101150363 | .1054229828 | .0000000000 |
| 82.9951 | -4.0845 | .0134150363 | .1616635332 | .0000000000 |
| 86.7676 | -3.7845 | .0173994689 | .2355334659 | .0000000000 |
| 90.5401 | -3.0319 | .0228509298 | .3317627568 | .0000000000 |
| 94.3126 | -1.9567 | .0290268696 | .4613627932 | .0000000000 |
| 98.0851 | -.4575 | .0358475220 | .6385193883 | .0000000000 |
| 101.0605 | 1.6082 | .0438244744 | .7531177871 | .0000000000 |
| 101.8576 | 2.9828 | .0541467716 | .8783917043 | .0000000000 |
| 104.1446 | 4.4520 | .0667596318 | 1.0800496560 | .0000000000 |
| 105.6301 | 6.6901 | .0809424786 | 1.2382361633 | .0000000000 |
| 107.3538 | 8.4140 | .0963855862 | 1.4703279156 | .0000000000 |
| 108.6271 | 10.7467 | .1127673782 | 1.6798629070 | .0000000000 |
| 109.4026 | 12.7501 | .1317545007 | 1.8272727289551 | .0000000000 |
| 110.3778 | 14.1108 | .1525209754 | 2.0474835446 | .0000000000 |
| 111.1338 | 16.0000 | .1727064855 | 2.2469325607 | .0000000000 |
| 111.8899 | 17.6232 | .1901892444 | 2.4815423453 | .0000000000 |
| 112.2679 | 19.4093 | .2061279146 | 2.6130291005 | .0000000000 |
| 112.6459 | 20.3720 | .1193593210 | 2.7571113631 | .0000000000 |
| 112.9483 | 21.3869 | .1193593210 | 2.9059099057 | .0000000000 |
| 113.1751 | 22.2395 | | 2.9059099057 | .0000000000 |
| | 22.9047 | | | |

ZOOM LENS FOR CAMERAS

DESCRIPTION

1. Field of Invention

This invention concerns zoom lenses for cameras particularly television cameras and the like, and particularly a television camera zoom lens having fixed lens groups and at least two independently movable lens groups the position of one of which is dependent on the position of the other, for zooming and focusing.

2. Background to the Invention

It is known to provide electrical control of moving elements in television zoom lens systems and U.S. Pat. No. 4,043,642 is one example of an automated zoom lens system.

The zoom lens system described in U.S. Pat. No. 4,043,642 has two movable lens devices described as the first and second movable lenses. For photographing which involves zooming, the second movable lens is firstly displaced along the axis of the lens for focusing. The first movable lens is then displaced and the amount of its displacement is detected by a first detecting means. The second movable lens is then displaced along the axis by an amount determined by its movement of the first movable lens. The displacement of the second movable lens in response to the movement of the first lens is determined by a functional equation which is set up as the optical system is designed while the positional adjustment of the second movable lens is controlled by lens displacement means and second detecting means. Magnification variation occurs as a result of displacement of the first movable lens and of the second movable lens and the result is that no change occurs in the final image focus condition.

It is an object of the present invention to provide an alternative television zoom lens system.

As distinct from the television zoom lens system described in the aforementioned U.S. patent, the invention provides for target values to be fed into drive systems for moving the relatively movable lens groups.

Such a system obviates the backlash and hunting normally associated with closed loop systems where the movement of one lens group interferes with the setting required for the other lens group.

SUMMARY OF THE INVENTION

According to the present invention in a zoom lens for cameras particularly television cameras and having fixed lens groups and at least two relatively movable lens groups there is provided:

(1)

Either:

means for generating a first information signal which determines the rate and direction of movement of the first movable lens group, and computing circuit means for computing a target value of X for the position to which the first movable lens group should move, depending on the last computed X and the rate of change of X (as determined by the value of the first information signal); or:

means for generating a fixed first information signal the value of which corresponds to the final position required of the first movable lens group;

(2) means for generating a second information signal whose value determines a relationship between the position of the first movable lens group and the position of the second movable lens group and which thereby controls the overall focal length of the lens groups;

(3) signal storage means for storing the computed target value of X for a given period of time (or for storing the fixed value of X corresponding to the final position required of the first movable lens group);

(4) further computing circuit means for computing from the stored target value of X (or the stored fixed value of X) a value Y corresponding to the position to which the second movable lens group must move so that the lens produces an in-focus image of an object at infinity;

(5) further computing circuit means responsive to the target (or fixed) value of X and the value of the second information signal, for computing a correction signal dY which when combined with the signal Y will produce an output signal whose value determines the position to which the second movable lens group must move so that the lens will produce an in-focus image of an object at a distance (less than infinity) determined by the selected value of the second information signal;

(6) further computing means responsive to the value dY and the value of Y to compute a new value YR where $$YR = Y + dY$$

and the YR signal comprises the said output signal;

(7) second signal storage means for storing the YR signal for the same period of time as the X signal is stored by the first signal storage means;

(8) a central processor responsive to the stored values of X and YR and to information signals relating to the actual positions of the first and second movable lens groups, and adapted to produce error signals ex and ey corresponding to any discrepancy between the actual positions of the movable lens groups and the target values X and YR for those groups, and (9) velocity servo control systems responsive to the two error signals for controlling the rate of movement and direction of movement of the first and second movable lens groups, depending on the values of the error signals ex and ey respectively, each of the velocity servo systems being arranged to come to rest when the actual postion of its movable lens group occupies the position determined by the relevant target value (X or YR) for that group.

Conveniently each velocity servo system comprises a velocity servo, drive means controlled thereby, a tachometer for determining the speed of rotation of the servo system and feedback means for combining the output of the tachometer with the control signal to the velocity servo.

Where the stored values of X and YR are digital values and/or the error signals ex and ey from the central processor unit are in digital form, digital to analogue converters are conveniently provided for converting the error signals to analogue signals before they are supplied to the velocity servo systems.

Stop signals may be generated by the central processor unit from information relating to the actual positions of the movable members and the target positional values determined by the values X and YR supplied thereto.

Conveniently the position of each movable lens group is measured by a transducer which converts the position of the movable group into an electrical signal, preferably a number of pulses for indicating absolutely (relative to a reference position), the actual position of the movable group relative to the fixed position.

Where a high level of accuracy is required, an optical system is associated with each movable group for generating Moire fringes and a Moire fringe detector is provided for counting the Moire fringes as the group is moved relative to the optical system. By arranging that the detector produces electrical pulses corresponding to the number of Moire fringes counted, so pulses are obtained as the output signal which latter can be accumulated by a pulse counter and delivered as a numerical value, into the central processor unit for processing with the X and YR signals.

The value of dY may be computed using an algorithm or alternatively a so-called look-up table, may be employed and a memory or store is provided in which a large number of different values of dY are stored for different values of X and Y and the appropriate correction signal dY is obtained by looking up appropriate values of X and Y.

Where the lens includes movable lenses or groups for correcting aberrations and the like, apparatus embodying the invention may be arranged to handle input signals corresponding to more than just zoom and focus, and such output signals may be arranged to control servo systems for moving for example, aberration correcting lens groups to obtain more uniform aberration correction throughout zooming.

Additionally the focus control may be replaced by an automatic focussing system operating from information derived from the final image, so as to ensure the latter is always sharply in focus. Where an automatic programme of zooming and focusing is required signals may be supplied to the system to establish values of X and YR to cause its servosystems to control the movable lens groups so as to perform the programme of zooming, focusing etc. The latter may be stored in a suitable buffer memory for later read out, to provide instructions to the servosystems to perform the programme of operations.

As before the movements required for aberration correcting lenses and lens groups may be stored in look up table type memories or may be computed from algorithms retained in the main CPU or in a subsidiary CPU.

The invention will now be described by way of example with reference to the accompanying drawings which illustrate by way of example a four element zoom lens embodying the invention having two relatively movable lens groups and two fixed lens groups, with a control system for moving the former, and in which:

FIG. 8 is the look up table of values for the algorithm of FIG. 7, FIGS. 9A and 9B illustrate one lens combination for the assembly of FIGS. 1 and 2.

DETAILED DESCRIPTION OF THE DRAWINGS

Figure 1:
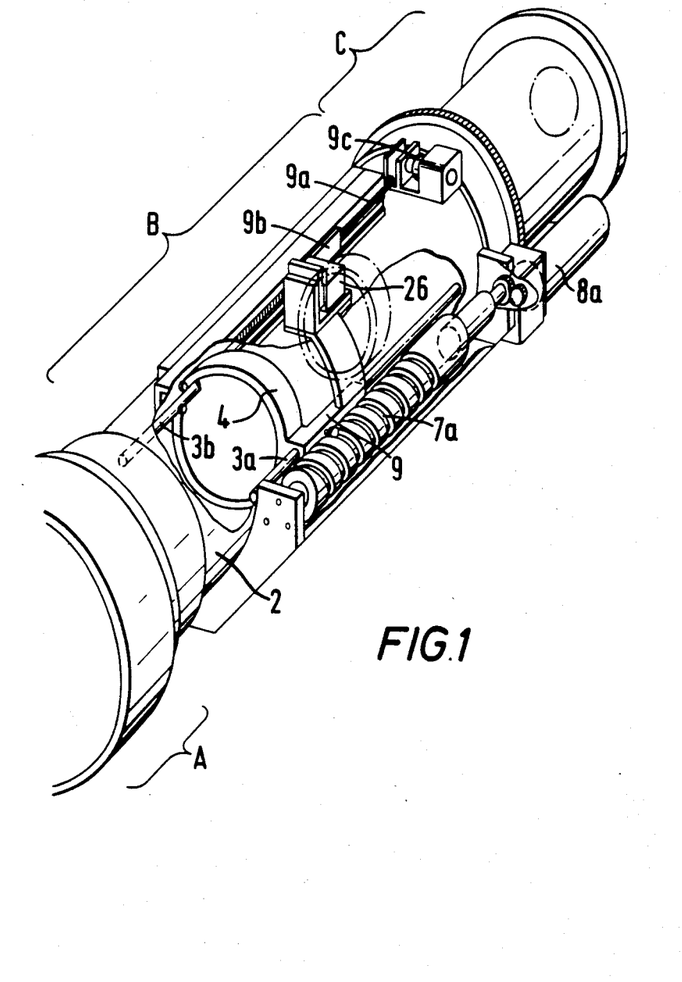
FIG. 1 is a perspective view of a zoom lens assembly to which the invention is applied.
Figure 2:
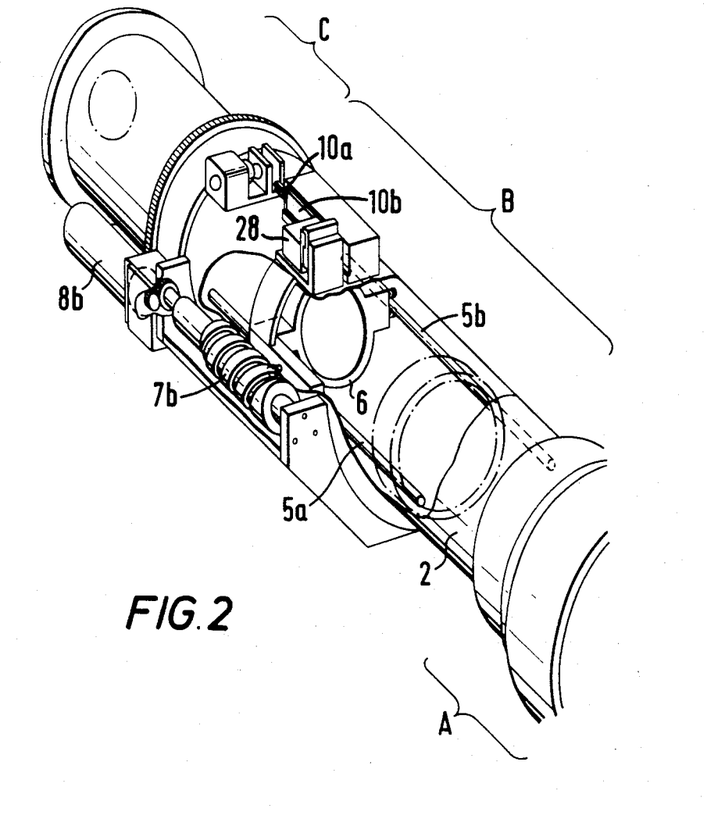
FIG. 2 is a second perspective view of the lens assembly of FIG. 1, the latter having been rotated through 180° about its axis and viewed from the other side.

Referring to FIGS. 1 and 2 the zoom lens assembly is made up of three main sections;
(1) a front section A, which contains the frontal lenses which remain fixed in position;
(2) a central section B, which contains the lenses which are moved to obtain the variation in the focal length and the focusing of the objective;
(3) a rear section C containing:
  i. a set of fixed lenses;
  ii. an iris not shown but controlled by a grooved rim.

The central section B is formed from a cylindrical body 2 which contains a first pair of fixed parallel spindles 3a and 3b which guide the barrel of the first movable lens assembly 4 in the longitudinal direction and a second pair of fixed parallel spindles 5a and 5b which guide a barrel of a second movable lens assembly 6.

The barrel 4 consists of sleeve which slides along the spindle 3a and two bearings whose gap is adjusted to the diameter of the spindle 3b.

A cam 7a with a thread of constant pitch effects the longitudinal displacement of the barrel 4 by engagement of a pinion secured to the barrel. A motor 8a drives the cam via a reduction gear.

Similarly the barrel 6 is moved by a motor 8b via cam 7b which is shorter than cam 7a in axial length.

The position of each lens element barrel is determined by an incremental optical detection unit of the Moire fringe type (diffraction grating). Thus the movement of item 4 is monitored by a fixed scale grating 9a and a movable index grating 9b whilst the movement of item 6 is monitored by a fixed scale grating 10a and a movable index grating 10b.

The shift of one with respect to the other will generate diffraction patterns which are converted to electrical pulses which are counted by an electronics system to be described later.

An initial position of an item 4 or 6 is detected when the index grating (9b or 10b) aligns with a corresponding Jones slit 9c or 10c, which forms part of an optoelectronic system which generates an electrical pulse to indicate that the initial position has been reached.

Figures 3, 3A:
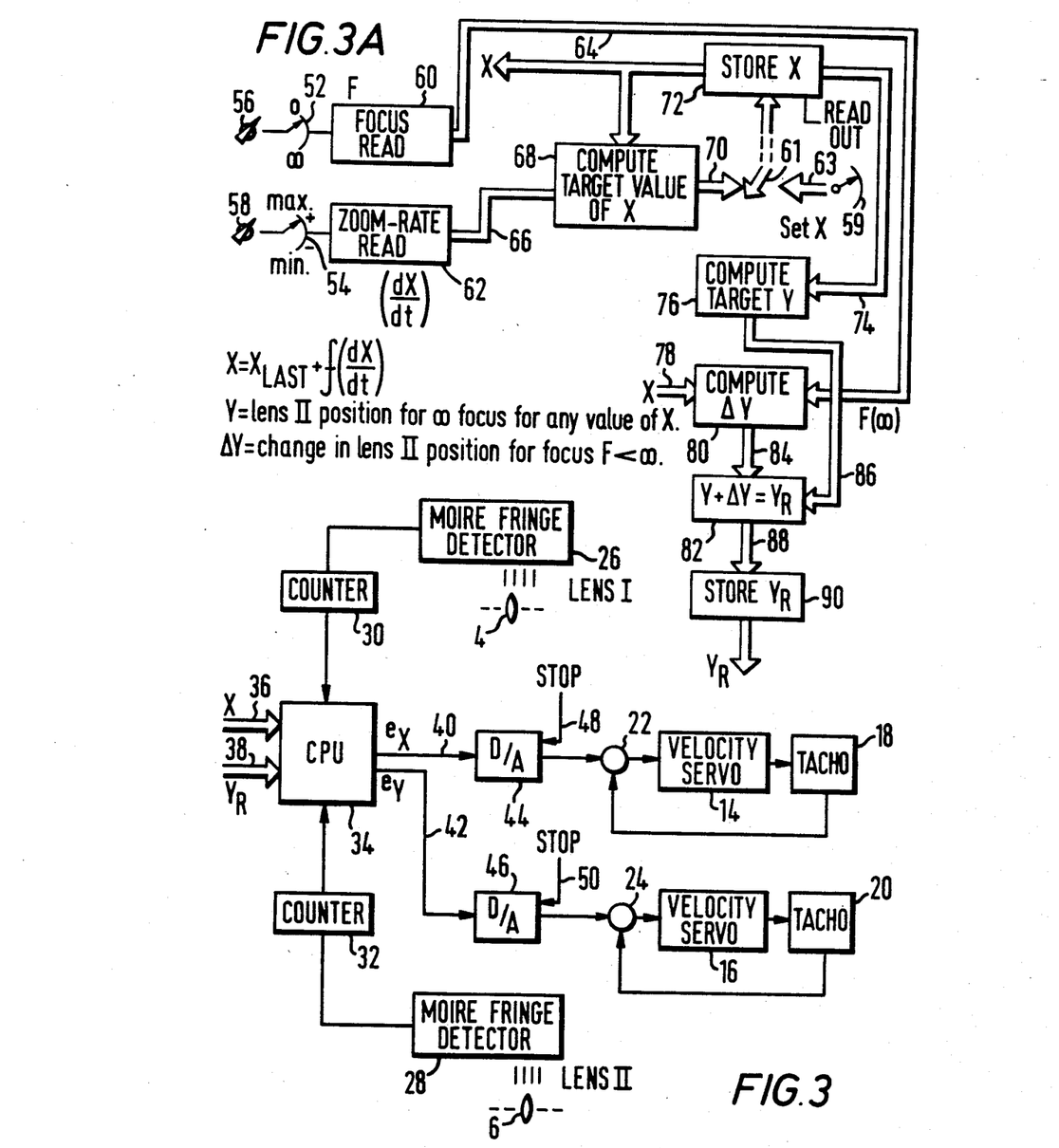
FIG. 3 is a schematic diagram showing the control system associated with the lens assembly of FIGS. 1 and 2.

In FIG. 3 the drives for first and second movable lens groups 4 and 6 include velocity servo systems 14 and 16 respectively. Associated with each servo system is a tachometer 18 and 20 respectively and the outputs from the tachometers 18 and 20 are supplied respectively as input signals to the gates 22 and 24 to control the velocity servo systems 14 and 16.

The absolute positions of each lens group 4 and 6 each measured relative to a fixed position, is determined using Moire fringe detector units 26 and 28 and counters 30 and 32 respectively. The detectors 26 and 28 are also designated in FIGS. 1 and 2.

The pulses counted correspond to the absolute position of each of the lens groups 4 and 6 and to this end the outputs from the counters 30 and 32 are supplied to a central processor unit (CPU) 34 which is programmed so as to compare the absolute pulse count value from counters 30 and 32 with target positional values supplied along data highways 36 and 38 so as to produce error signals along lines 40 and 42 denoted by $e_x$ and $e_y$ respectively.

The central processor unit (CPU) 34 is typically a digital device so that the error signal $e_x$ and $e_y$ along lines 40 and 42 will also be digital signals. Digital to analogue converters 44 and 46 are provided for supplying analogue versions of the digital signals as the other input signals to the gates 22 and 24.

Stop signals may be derived from the central processor unit and may be supplied along line 48 and 50 to the digital to analogue converters 44 and 46 respectively. Such stop signals are generated by the central processor unit whenever the pulse count value from 30 or 32 corresponds to the target value X or YR along data highways 36 and 38 respectively.

The invention provides for the generation of the values X and YR from two input signals derived from potentiometers 52 and 54. The first is adjustable by means of control 56 and is set to produce a voltage the value of which will control the relative positions of the two movable lens groups so that an object positioned at a particular distance (less than infinity) from the lens, will be in focus.

The second potentiometer is adapted to produce a positive or negative polarity voltage from a mid position at which zero voltage is produced, so as to produce a voltage whose polarity and magnitude determines the direction and rate at which the movement of the two movable lens assemblies is to occur. A voltage of large magnitude is intended to correspond to a high rate of zoom and a small voltage to a low rate of zoom and the zero voltage at the centre of the control is intended to indicate no movement and therefore no zooming.

The control 58 is centered by spring means so as to normally produce a zero voltage from the potentiometer. Zooming can then be achieved by moving the control to the left or to the right by either a smaller or larger amount depending on the rate of zoom required. As soon as the required zooming has been achieved, the control is released to allow it to centre and produce a zero signal.

The voltages from the two potentiometers 52 and 54 are supplied to two read circuits 60 and 62 respectively to produce digital signals corresponding to the analogue values from the potentiometers for inputting via data highways 64 and 66 into computing circuits 80 and 68 respectively. These may form part of the central processor unit (CPU) 34 if required.

The computing circuit 68 produces a value of X along data highway 70 which is derived from the sum of the last computed value of X derived from a store 72 and a value derived from the rate of zoom called for by the potentiometer 58.

The function from which X is computed is shown in FIG. 3A and it will be seen that if a high rate of zoom is called for, then the second term will be greater than if a lower zoom rate is called for. If a high zoom rate is called for, the first lens element will have to move much further during any particular period of time than if only a low zoom rate has been called for.

The updated value of X is made available for insertion in the store 72, via data highway 70 and highway 60 selector 61.

The stored value of X is also supplied via data highway 74 to a further computing circuit 76 (which may also form part of the central processor unit 34) which is set to compute a target value of Y, i.e. a position to which the second movable lens group 6 must move to produce an infocus image of an object at infinity. Y is the position to which the second lens group must move so as to obtain an infocus image of an object at infinity for any particular value of X supplied to the computing circuit 76.

If, as will usually be the case, focus on nearer objects is required, determined by appropriate settings of the potentiometer 52, the revised value of Y, (YR) is determined by first determining a correction signal dY. This correction signal is computed from the last stored value of X and the value of the focus signal F from potentiometer 52.

To this end a digital value corresponding to the desired focusing distance is supplied along data highway 64 to the computing circuit means 80 (which may also form part of the central processor unit 34), together with a digital value of the signal X, along highway 78.

A correction dY is computed either by using a look up table (i.e. a memory containing a large number of values of dY for different values of X and F), or by using an algorithm, built for example into the computing function of the stage 80.

The value of Y is supplied to a further computing stage 82 via a data highway 84 and the value of Y is supplied via a data highway 86 and a computing circuit 82 is set to combine the two values of Y and dY so as to produce a revised signal YR (YR=Y+dY) along the data highway 88 for storage in a further store 90. The store 90 may form part of the store 80 or store 72 and some or all of the stores may form part of the central processor unit 34.

If the zoom rate control 58 is left at the zero position, a value of dY will be computed such that the value of YR will achieve an infocus image in the focal plane of the zoom lens of an object placed at a distance from the zoom lens determined by the setting of the focus control 56. (This governs the value of the focus control signal from the potentiometer 52).

The central processor unit 34 will thus be provided with a constant value of X and a value of YR which will produce an error signal ey (ey not equal to 0) at such time as the positional information from the Moire fringe counter 32 indicates that the second lens group is at the correct position required by the value YR, whereupon the value of ey effectively reduces to zero.

In some cases it may be preferred that the operator can select a particular focal length for the overall lens and zoom to that selected focal length. To this end the selector 61 is provided so that in place of the output from computing means 68, a signal from a potentiometer 59 may be supplied via data highway 63 and selector 61 to the store 72. This "fixed" value of X is then left in the store 72 and the values of Y, dY and YR computed therefrom.

Although not shown, a series of values of F (from 52, 60) values of X (from 59, 63) covering a sequence of zooming and focusing and constituting a programme, may be stored in a suitable memory (not shown) which on being read, will supply control signals for the zoom lens to control same in accord with the programme.

Figure 4:
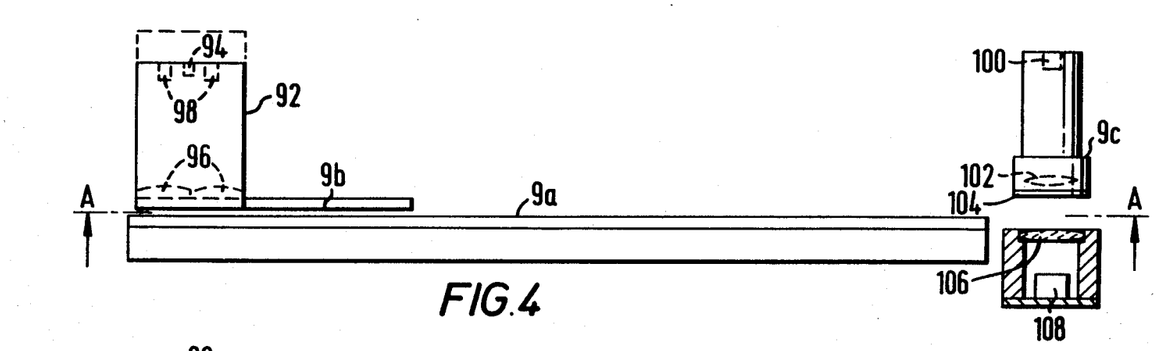
FIG. 4 is a plan view of the lens movement and position detectors shown in FIGS. 1 and 2.
Figures 5, 6:
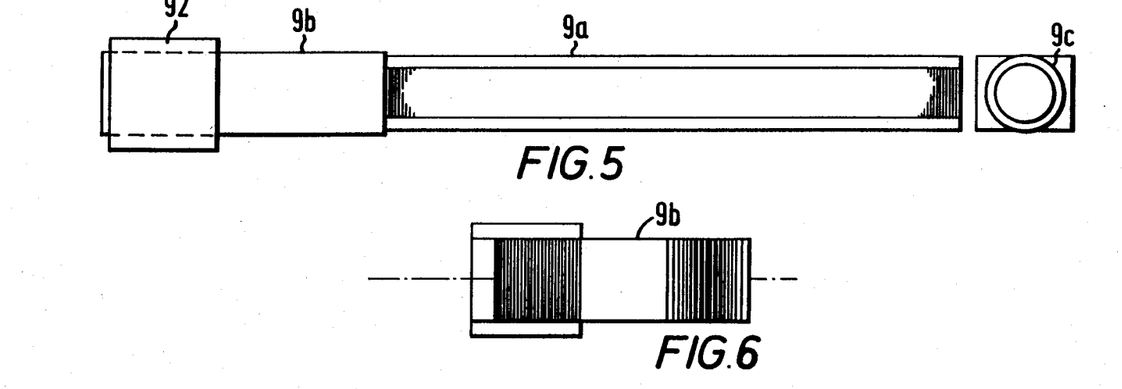
FIG. 5 is a side view of the scale grating of FIG. 4.
FIG. 6 is a side view of the combined index grating and Jones slit grating which moves relative to the scale grating in FIG. 4, FIG. 7 contains the algorithm for determining the value dY.

Referring to FIGS. 4, 5 and 6 the lens group positions are ascertained by Moire fringe counting. To this end FIG. 4 shows the fixed scale grating 9a and the index grating 9b which being attached to the lens barrel 4 move with the latter. A Moire fringe reading head 92 detects the movement of one grating relative to the other and produces pulses for counting.

At one end a Jones slit module 9c provides an output pulse when the Jones slit section of the index grating 9b aligns therewith.

The scale grating 9a is a reflective grating and is typically chromium on glass, whilst the index grating 9b is typically a transmission grating through which light can pass. The reading head 92 and the Jones slit module 9c will now be described in more detail.

The Moire fringe transducer is in a plane parallel to the zoom lens axis. Light from an L.E.D 94 is collimated by a lens pair 96 and passes through the index grating 9b to the scale grating 9a. Reflected light is collected by the lenses which form images of the source at two detectors 98. The two detectors view the zero diffraction order from the index scale grating combination.

The two grating combination can be considered as the dispersive element of a reflecting spectroscope. The detector in this case is positioned to receive light from the zero order group only. Interference between the different beams, which contribute to this order group, causes Moire fringes to be formed.

The preferred device types are OPTRON type OP 641 for the phototransistor detectors, and OPTRON type OP 123/124 for the light emitting diode (L.E.D).

The Jones slit transducer 9c comprises a solid state light source 100 which provides illumination collimated by lens 102. The collimated beam projects a shadow image of a fixed Jones slit 104. If the centre of the shadow projection and the moving Jones slit of grating 9b coincide then the light transmission of the system is a minimum. In any event the light passing through the slit (or slits) is decollimated by a lens 106 and falls on photocell 108. All elements, except Jones slit 9b, are fixed rigidly to the zoom lens housing.

A preferred light emitting diode 100 is type OP 130 W manufactured by Optron.

The Jones slit transducer 9c is a fixed unit which can be placed at any position on the lens group travel. The centre of the Jones slit index within the transducer defines the datum position. The datum is shown set at one end of the lens group travel in the drawing.

An alternative may be to establish the datum from a lens calibration procedure. For example the lens could be set up using an optical test target (such as a resolution chart) at a position of best focus. On a calibration instruction the lens groups would move automatically to datum positions counting distances moved from the incremental encoders. The datum positions are then stored in a memory.

The datum transducer provides a narrow electrical pulse when the two Jones slits are in coincidence. The width of the pulse corresponds approximately to a displacement of typically 30 micrometers. The height of the pulse is determined by the light source output power, the sensitivity of the photodetector and the alignment of the transducer. Since each of these is a function of many variables it is expected that, variations in the height of the datum pulse will occur over a period of time. The centre of the datum pulse is, however much less affected by the above variables and can be relied upon for accurate datum sensing.

The centre of the datum pulse can be ascertained by comparing the Jones slit output signal with a threshold voltage and producing a pulse when the output signal exceeds the threshold and using the generated pulse to gate a regularly occuring sequence of electrical pulses the middle one of which is taken to correspond to the middle of the Jones slit output signal and therefore to correspond to the centre of the datum pulse.

Figure 7:
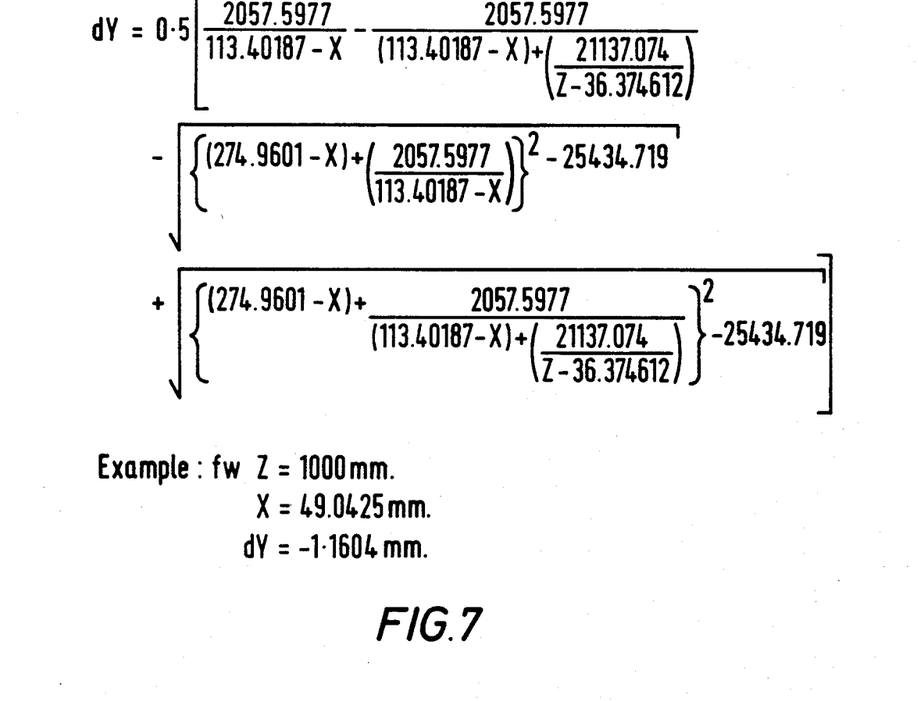

FIG. 7 contains the algorithm from which values of dY can be computed by the central processor unit. Variables that are required are the focal length Z, and the last stored value of X. From this a value dY can be computed.

In the algorithm:

X is the displacement of the first movable lens group (i.e. lens group 4 as shown in FIG. 3), Z is the distance between the lens and an object which will be in focus in the image formed by the lens assembly, and dY is the correction to the lens group 2 position (i.e. lens group 6 in FIG. 3) which is required if Z is less than infinity, for any given value of X.

The actual value for the position of the second movable lens group in order to achieve focus of an object not at infinity is obtained using the formula:

$$Y = Y_n + dY$$

where:

$Y_n$ corresponds to the actual position of lens group 2 for an object in infinity to be in focus and, dY is obtained from the algorithm previously referred to.

The value $Y_n$ is most simply obtained from a look up table of which an example is given in FIG. 8. In the table:

X is the position of lens group 1 relative to a datum, and

Y is the corresponding position of lens group 2 relative to its datum if an object at infinity is to be focused by the overall lens.

For values of X not in the look up table (i.e. between the values shown in the look up table but not specified) the corresponding value of Y is interpolated using the formula:

$$Y_n = Y_a + y$$

where:

$Y_n$ is the actual position of lens group 2 for an object at infinity to be in focus, $Y_a$ is the nearest lower value of Y in the look up table and y is calculated from the following formula namely:

$$y = A \cdot (dX)^2 + B \cdot dX + C$$

where:

$$dX = X_n - X_a$$

and:

$X_n$ = the actual position of lens group 1, $X_a$ is the nearest lower value of X in the table and A, B and C are obtained from the table in the line containing the value $X_a$.

Figure 9A:
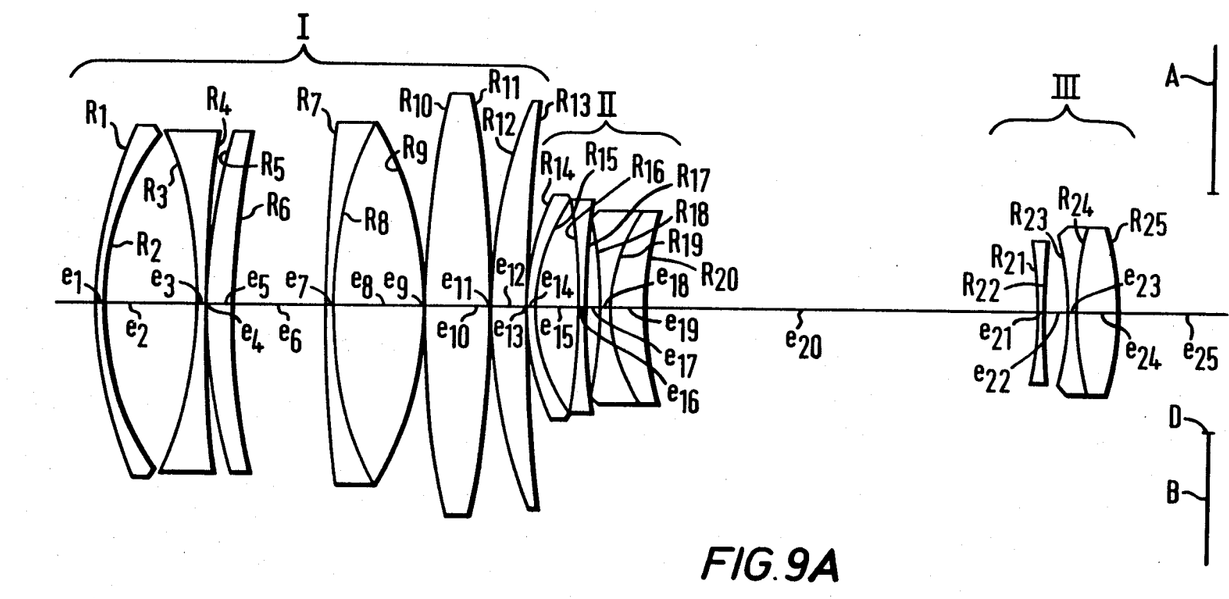
Figure 9B:
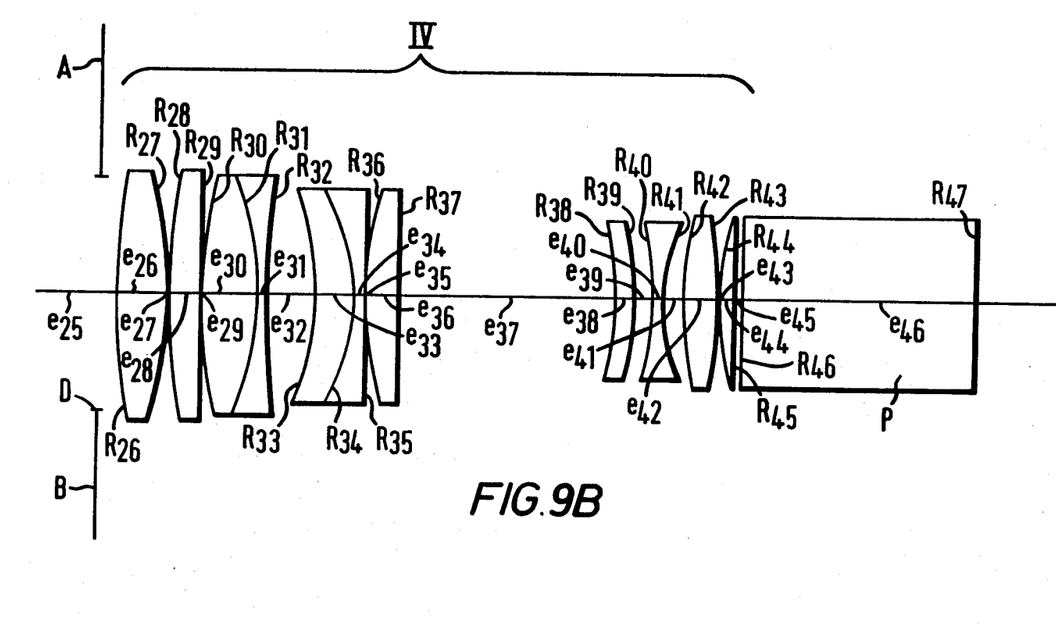

FIGS. 9A and 9B illustrate four groups of lens elements such as are employed in FIGS. 1 and 2 namely two movable groups II and III placed between two stationary groups I and IV.

The three first groups I, II and III are placed in front of the diaphragm D whilst the fourth group IV is placed behind the diaphragm.

Of the two movable groups II and III, the group which is placed in front, namely group II, has the sole function of variation of the focal length of the objective.

This group, however, is intended to pass through a magnification of unity.

On the other hand, the design concept of the system is such that the second movable group III does not pass at all through a magnification of unity. This group possesses both a function of variation in focal length of the objective and an additional function of focusing of the system.

Finally the stationary front group I has the intended function of producing a real image of the object which is variable both in position and in magnification according to the position of the object 1.

The stationary group I comprises 7 lens elements, namely a divergent meniscus lens whose convex faces directed towards the object, a bi-concave divergent lens, a convergent meniscus lens, a cemented doublet constituted by a divergent lens and a bi-convex convergent lens, a bi-convex convergent lens and a convergent meniscus lens whose convex face is directed towards the object.

The first movable group II is made up of four lens elements, namely a divergent meniscus lens whose convex face is directed towards the object, a divergent lens, a doublet constituted by a bi-concave divergent lens and a convergent lens.

The second movable group III is made up of three lens elements, namely a bi-concave divergent lens, a doublet constituted by a bi-concave divergent lens and a bi-convex convergent lens.

The fourth stationary group can comprise eleven lens elements, namely two bi-concave convergent lenses, a doublet constituted by a bi-convex convergent lens and a divergent lens, a doublet constituted by a convergent lens and a divergent lens, a convergent lens, a convergent meniscus lens, a bi-concave divergent lens and two convergent lenses.

We claim:

1. A camera zoom lens having fixed lens groups and at least two relatively movable lens groups and a controller comprising:
    (1) means for generating a first information signal which corresponds to a target value of X for the position to which the first movable lens group should move;
    (2) means for generating a second information signal whose value determines a relationship between the position of the first movable lens group and the position of the second movable lens group and which thereby controls the overall focal length of the lens groups;
    (3) signal storage means for storing the computed target value of X;
    (4) first computing circuit means for generating from the stored target value of X a signal corresponding to a value Y representing the position to which the second movable lens group must move so that the lens groups produce an in-focus image of the object at infinity;
    (5) second computing circuit means responsive to the target value of X and the value of the second information signal for generating a correction signal dY which when combined with the signal Y produces an output signal whose value determines the position to which the second movable lens group must move so that the lens groups will produce an in-focus image of an object at a distance (less than infinity) determined by the selected value of the second information signal;
    (6) third computing means responsive to the signal value dY and the value of Y for generating a target signal value YR (where YR=Y+dY) for the second movable lens group;
    (7) second signal storage means for storing the YR signal;
    (8) sensing means for producing information signals relating to the actual positions of said first and second movable lens groups;
    (9) a central processor unit responsive to the stored values of X and YR and to the actual position-representative signals for producing two error signals $e_X$ and $e_y$ corresponding to any discrepancy between the actual positions of the movable lens groups and the target values X and YR for those groups; and
    (10) velocity servo control systems responsive to the two error signals for controlling the rate of movement and direction of movement of the respective first and second movable lens groups, each of the velocity servo systems being arranged to come to rest when the actual position of its associated movable lens group occupies the position determined by the relevant target value (X or YR) for that group.

2. A lens as claimed in claim 1 wherein each velocity servo control system comprises a velocity servo, drive means controlled thereby, a tachometer for producing a signal corresponding to the speed of rotation of the servo system and feedback means for combining the tachometer signal with the control signal and applying the combined signals to the velocity servo.

3. A lens as claimed in claim 1 wherein at least the error signals $e_X$ and $e_Y$ from the central processor unit are in digital form and the controller includes digital to analog converters for converting the error signals to analog signals before they are supplied to the velocity servo systems.

4. A lens as claimed in claim 1 wherein stop signals are generated by the central processor unit from information signals relating on the one hand to the actual positions of the movable group and on the other hand to the target positional values, determined by the values X and YR supplied thereto.

5. A lens as claimed in claim 1 wherein the position of each movahle lens group from a datum is measured by a transducer which converts the position of the movable group into an electrical signal.

6. A lens as claimed in claim 5 wherein an optical system is associated with each movable lens group for generating Moire fringes and a Moire fringe detector is provided for counting the Moire fringes as the group is moved.

7. A lens as claimed in claim 1 wherein the value of dY is computed using an algorithm.

8. A lens according to claim 1, wherein the controller includes a memory in which a large number of diffcrent values of dY are stored for different values of X and the nearest value of dY for a given value of X is selected automatically.

9. A lens as claimed in claim 1 wherein the lens includes further movable groups of lenses for correcting aberrations, and means is provided to move said further movable lens groups in response to signals supplied thereto to stabilize aberration correction throughout zooming.

10. A lens as claimed in claim 9 wherein the movement signals required to effect aberration correction movement of lens groups are stored in look-up table type memories.

11. A lens as claimed in claim 9 wherein the movement signals required to effect aberration correction movement of lens groups are computed from algorithms retained in the main central processing unit or in a subsidiary central processing unit.

12. A lens as claimed in claim 1, wherein the focus control is achieved by an automatic focussing system operating from information derived from a final image, so as to ensure the latter is always sharply in focus.

13. A lens according to claim 1 wherein the means for generating the first information signal comprises means for generating a rate of change signal which determines the rate and direction of movement of the first movable lens group and means for computing a target value of X for the position to which the first movable lens group should move, depending on the last computed value of X and the rate of change of X as determined by the value of the rate of change signal.

14. A lens according to claim 1, wherein the means for generating the first information signal comprises means for generating a fixed first information signal the value of which corresponds to the final position required of the first movable lens group.

* * * * *